March 19, 1968     I. F. BARDITCH ETAL     3,374,425
CASCADED POWER SUPPLY FOR PRODUCING A CLEAN D-C OUTPUT
Filed May 19, 1966
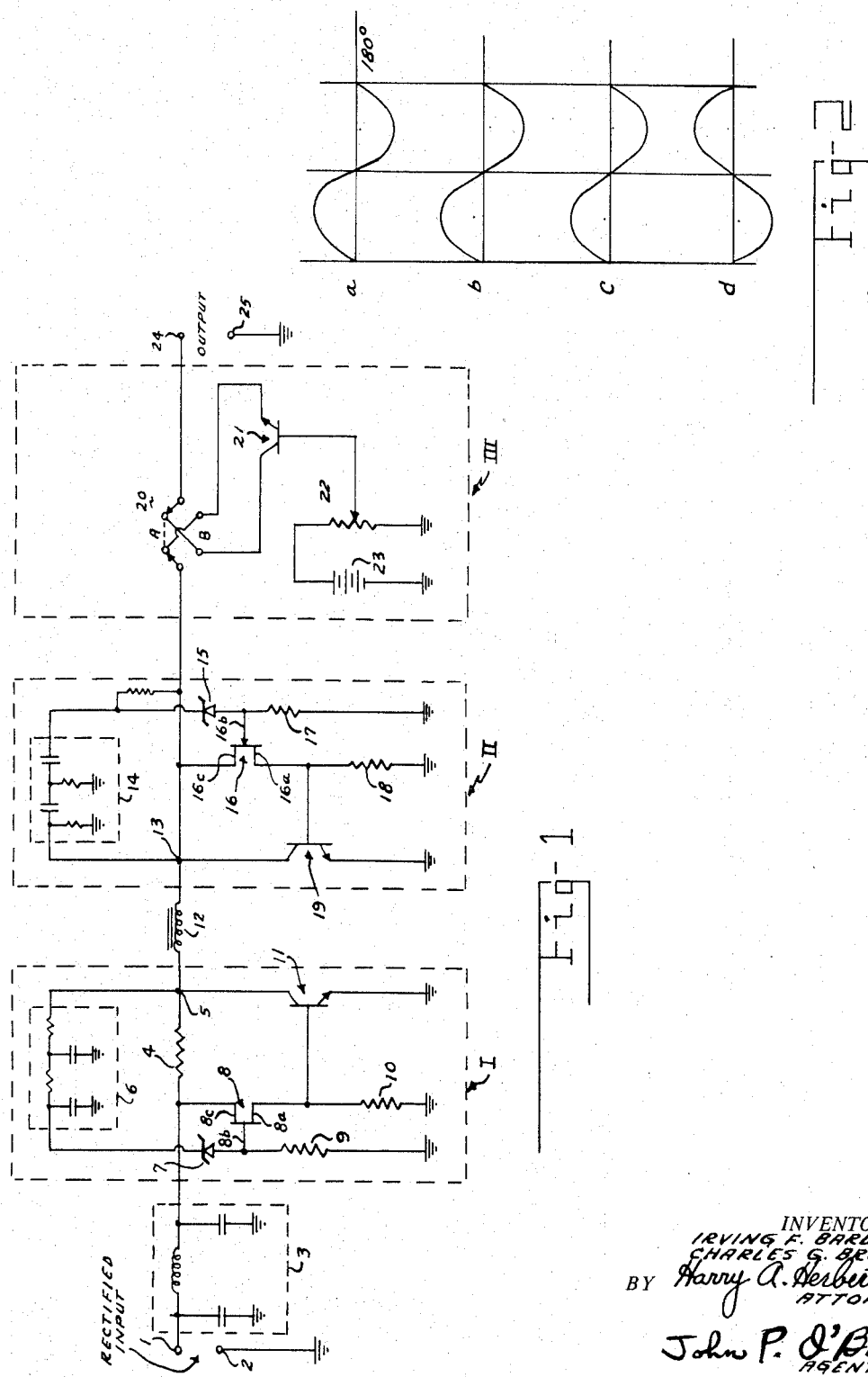
INVENTORS
IRVING F. BARDITCH
CHARLES G. BROOKS
BY Harry A. Herbert Jr.
ATTORNEY
John P. O'Brien
AGENT 3,374,425
CASCADED POWER SUPPLY FOR PRODUCING A CLEAN D-C OUTPUT
Irving F. Barditch and Charles G. Brooks Baltimore, Md., assignors, by mesne assignments, to the United States of America as represented by the Secretary of the Air Force
Filed May 19, 1966, Ser. No. 551,866
3 Claims. (Cl. 323—22)

This invention relates to a regulated power supply that in addition to correcting the effects on the output voltage of relatively low frequency line and load changes, also cancels ripple from the rectified input and cancels load transients to produce a clean D-C output.

Previous to this invention, most power supplies have employed the same series transistor as a variable impedance to provide all the voltage regulation including cancelling the low frequency ripple and high frequency transients. Because high current transistors have such a poor high frequency response, previous power supplies of this type have been limited to carry low currents. The power supply of this invention is designed to have a high current capacity. The greater current capacity is obtained by using three transistors as variable impedances and employing each transistor in a separate section of the power supply to perform a separate and distinct function. The first section is constructed to cause part of the high current rectified input to flow through a high current, low frequency transistor in such a manner as to cancel the ripple. The second section which cancels high frequency transients from the load employs a low current, high frequency transistor and is designed so that this transistor carries only the low current, high frequency load transients from the load employs a low current, high frequency transistor and is designed so that this transistor carries only the low current, high frequency load transients. The third section utilizes a high current series transistor which regulates the output voltage only against relatively low frequency line and load changes.

An object of the present invention is to devise a new and improved power supply which is designed to produce a clean D-C output signal and capable of carrying large D-C currents through it. Compared to other power supplies, the novel circuit provided by this invention is much simpler in construction and operation.

The above-mentioned and other features and objects of this invention and the manner of attaining them will become more apparent and the invention itself will best be understood by reference to the following description taken in conjunction with the accompanying drawing, wherein:

FIG. 1 is a schematic showing of a system embodying the invention, and

FIG. 2 represents the phase relationship of the ripple signal at various points in the power supply.

Referring to FIG. 1, the invention is shown as being made up of three major sections. Section I is designed to cancel the ripple components from the rectified input signal. Section II operates to cancel transients and other undesired signals from the load. Section III is designed to give either a constant current or constant voltage output at a particular output level.

In FIG. 1, a rectified input voltage is applied across terminals 1 and 2, terminal 2 being grounded. The rectified input passes through low pass filter 3, which reduces but does not completely remove the ripple in the rectifier's output.

As the rectified input passes through Section I, the ripple voltage is cancelled in the manner that will now be explained. Part of the voltage at point 5 which is dropped across load resistor 4 is fed through low pass filter 6 to the control electrode 8b of field effect transistor 8. Low pass filter 6 serves to restrict the response of this portion of the circuit to voltage variations at and below the ripple frequency. It will also block any high frequency components in voltage feedback which could possibly cause a positive feedback component in the feedback loop that would initiate unwanted oscillations.

Zener diode 7 serves as a low impedance coupling between the low pass filter 6 and the control lead 8b of field effect transistor 8. The breakdown voltage of zener diode 7 is selected to provide the proper direct operating voltage at the gate electrode 8b of field effect transistor 8, operating as part of a potential dividing circuit including resistor 9 in a conventional biasing arrangement.

Resistor 10 serves as a load impedance for transistor 8 and also as a means for establishing the proper direct current operating conditions for both transistor 8 and transistor 11. Transistor 11 is chosen to be of the high current, low frequency response type.

A field effect transistor is a new type of transistor whose construction and operation is fully explained in U.S. Patent No. 3,183,128. Briefly, field effect transistor operates in the following manner. The magnitude of voltage applied to gate electrode 8b controls the current flowing through the channel between source electrode 8a and drain electrode 8c. Thus, when the feedback voltage applied to gate electrode 8b increases, the current flowing through the channel of transistor 8 increases proportionally. Such an increase in current causes an increase voltage drop across load resistor 10, which initiates an increase in current flow through transistor 11.

Transistor 11 is connected in the grounded emitter configuration so that its output signal is 180° out of phase with its input signal. It is this phase reversal that provides the cancellation of the ripple. Reference is made to FIG. 2, which shows the phase relationship of the ripple at various points in Circuit I. FIG. 2a represents the unwanted ripple appearing at point 5. FIG. 2b represents the input voltage to transistor 8. FIG. 2c is the waveform for the input voltage to transistor 11, and FIG. 2d is the output voltage waveform which is in phase opposition with the input. The waveform shown in FIG. 2d is also in phase opposition with that of FIG. 2a, which is how the ripple signal appearing at point 5 of FIG. 1 is cancelled.

This invention is not limited to the use of a field effect transistor as the control element. The conventional bipolar transistor may be used. The only requirement is that the feedback voltage must have its phase reversed. Thus, by using complementary transistors for elements 8 and 11 the cancellation would result since it doesn't matter whether transistor 8 or transistor 11 reverses the phase of the feedback signal.

Considering the operation of Section I, from a slightly different viewpoint, the collector-emitter path of transistor 11 is a variable resistance, the value of which depends upon the base-emitter potential. This shunt resistance and fixed series resistance 4 from a potential divider across the rectifier output so that the potential at point 5 is directly related to the value of the variable resistance. If there is a tendency for the potential of point 5 to increase, for example, there results an increase in the forward base-emitter potential of transistor 11, due to the feedback through transistor 8, which lowers the collector-emitter resistance of transistor 11 and thereby opposes the tendency for the potential of point 5 to increase. With sufficient gain in transistors 8 and 11, variations in the potential of point 5, in the frequency range passed by filter 6, may be held within very narrow limits.

Section II operates in the same manner as Section I to cancel the unwanted high frequency transients that occur in the output load circuit. Inductor 12 prevents these high frequency transients from reaching Section I, resulting in Section II being isolated from Section I. Part of the high frequency transient voltage which appears at point 13 is fed back through high pass filter 13 and is applied to the gate electrode 16b. Zener diode 15 serves as a low impedance coupling between filter 14 and transistor 16. The breakdown voltage of zener diode 7 is selected to provide the proper direct potential at the gate electrode 16b of field effect transistor 16. Resistors 17 and 18 are biasing and coupling resistors for transistors 16 and 19, respectively. Transistor 19 is selected to be the low current type with a good frequency response.

Section II operates in exactly the same manner as Section I, the counterpart of series resistor 4 being the interval resistance of the source of the transients, so that the waveforms shown in FIG. 2 also represent the phase relationship between the transient voltages at various points. FIG. 2a corresponds to the waveform at point 13. FIG. 2b is representative of the voltage waveform applied to gate electrode 16b. FIGS. 2c and 2d represent, respectively, the input and output voltage waveform of transistor 19. For cancellation the waveform shown in FIG. 2d must be in phase opposition to the FIG. 2a waveform.

The above discussion concerning the fact that a conventional bipolar transistor could be used in place of field effect transistor 8 would, of course, also apply to field effect transistor 16 of Section II.

Section III is designed to produce at the power supply output terminals 24 and 25, either a constant current or constant voltage signal. The position of mode selector switch 20 determines whether the output will be constant current or constant voltage.

Potentiometer 22, in conjunction with battery 23, is used to set the output level of the power supply.

The switch 20 is shown in the drawing as being in mode A. In this mode, the output is taken from the collector of transistor 21. In mode A, transistor 21 has a high output impedance, since the load current flows in the back direction through the emitter-base junction, so as to provide a constant current output.

When in mode B, the output is taken from the emitter to ground of transistor 21. This arrangement provides a low output impedance for the transistor 21 and maintains a constant voltage, of value determined by the setting of potentiometer 22, across the output terminals 24 and 25 within the limits set by the frequency response and gain of this high current transistor.

We claim:
1. A voltage regulating circuit for connection between the output of an alternating current rectifier and a load, said circuit comprising:
  (a) three cascaded sections with a series inductor connected between the first and second sections, counting from the rectifier end of the circuit;
    (1) said first section comprising
      (a) a series fixed resistance element,
      (b) a shunt variable resistance element located at the load end of said series resistance element, and
      (c) means sensing the voltage across said shunt resistance element and responsive to changes in said voltage at the ripple frequency of said rectifier and below for producing conversely related changes in the resistance of said shunt element;
    (2) said second section comprising
      (a) a second shunt variable resistance element, and
      (b) means sensing the voltage across said second shunt resistance element and responsive to changes in said voltage at frequencies above said ripple frequency for producing inversely related changes in the resistance of said second shunt element; and
    (3) said third section comprising
      (a) a transistor,
      (b) a two-position switching means operative in one position to connect the collector-emitter path of said transistor serially in said circuit for load current conduction in the forward direction of the emitter-base junction and in the other position for conduction in the back direction of the emitter-base junction, and
      (c) means for applying an adjustable direct reference voltage to the base of said transistor.

2. A voltage regulating circuit, as defined in claim 1, wherein:
  (a) said means sensing the voltage across said shunt resistance element comprises:
    (1) a field effect transistor having its source electrode connected to the line between said output of an alternating current rectifier and said series inductor and having its drain electrode connected to the first terminal of said shunt variable resistance element,
    (2) a load impedance connected across the first and second terminals of said shunt variable resistance element,
    (3) low pass filter having its input terminals connected across the second and third terminals of said shunt variable resistance and having its output terminals connected across the control electrode of said field effect transistor and said second terminal of said shunt variable resistance; and,
  (b) said means sensing the voltage across said second shunt resistance element comprising:
    (1) a second field effect transistor having its source electrode connected to the line connecting said second inductor to said third section and having its drain electrode connected to the first terminal of said second shunt variable resistance element.
    (2) a second load impedance connected across the first and second terminals of said second shunt variable resistance element, and
    (3) high pass filter having its input terminals connected across the second and third terminals of said second shunt variable resistance element and having its output terminals connected across the control electrode of said second field effect transistor and said second terminal of said second shunt variable resistance element.

3. A voltage regulating circuit, as defined in claim 2, wherein:
  (a) said shunt resistance element comprises a high current type transistor having a base, emitter and collector correspond, respectively, to said first, second and third terminals of said shunt resistance element, and
  (b) said second shunt resistance element comprises a low current type transistor having a base, emitter and collector correspond, respectively, to said first, second and third terminals of said second shunt resistance element.

No references cited.

JOHN F. COUCH, *Primary Examiner.*

W. M. SHOOP, *Assistant Examiner.*